United States Patent [19]

Merris, Jr.

[11] Patent Number: 5,364,610

[45] Date of Patent: Nov. 15, 1994

[54] PROCESS FOR PREPARATION OF HIGH OPACITY PRECIPITATED CALCIUM CARBONATE BY REACTING SODIUM CARBONATE WITH CALCIUM HYDROXIDE

[75] Inventor: Charles S. Merris, Jr., Lancaster, Pa.

[73] Assignee: P. H. Glatfelter Company, Spring Grove, Pa.

[21] Appl. No.: 76,861

[22] Filed: Jun. 15, 1993

[51] Int. Cl.$^5$ ............................................. C01D 7/02
[52] U.S. Cl. .................................... 423/432; 423/430
[58] Field of Search ................... 423/432, 430, 165; 106/464; 162/181.2

[56] References Cited

U.S. PATENT DOCUMENTS

| | | | |
|---|---|---|---|
| 802,657 | 10/1905 | Pennock | 106/464 |
| 1,379,157 | 5/1921 | Alton | 423/160 |
| 2,058,503 | 10/1936 | Rafton et al. | 23/66 |
| 2,062,255 | 5/1937 | Brooks et al. | 134/58 |
| 2,080,616 | 5/1937 | Lynn et al. | 23/66 |
| 2,081,112 | 5/1937 | Statham et al. | 23/66 |
| 2,189,832 | 2/1940 | Rafton | 92/21 |
| 2,198,223 | 4/1940 | Muskat et al. | 23/66 |
| 2,211,908 | 8/1940 | O'Connor | 23/66 |
| 2,313,844 | 3/1943 | Sullivan | 23/66 |
| 2,538,802 | 1/1951 | Schur | 23/66 |
| 2,631,922 | 3/1953 | Schur et al. | 23/66 |
| 2,802,719 | 8/1957 | Avedidian | 23/66 |
| 2,964,382 | 12/1960 | Hall, Jr. | 23/66 |
| 2,979,380 | 4/1961 | Miller | 423/432 |
| 2,981,596 | 4/1961 | McClure | 23/66 |
| 3,126,253 | 3/1964 | Podschus | 23/66 |
| 3,150,926 | 9/1964 | Pope et al. | 23/66 |
| 3,179,493 | 4/1965 | Diekmann et al. | 23/66 |
| 3,268,387 | 8/1966 | Casciani et al. | 162/30 |
| 3,268,388 | 8/1966 | Bauman et al. | 423/432 |
| 3,320,026 | 5/1967 | Waldeck | 23/66 |
| 3,337,359 | 8/1967 | Bauman | 106/293 |
| 3,347,624 | 10/1967 | Taylor | 23/66 |
| 3,627,480 | 12/1971 | Birchall | 23/66 |
| 3,920,800 | 11/1975 | Harris | 423/432 |
| 4,133,894 | 1/1979 | Shibazaki et al. | 423/432 |
| 4,367,207 | 1/1983 | Vanderheiden | 423/432 |
| 4,627,888 | 12/1986 | Engdahl | 162/30.11 |
| 4,714,603 | 12/1987 | Vanderheiden | 423/432 |
| 4,927,618 | 5/1990 | Mathur et al. | 423/432 |
| 5,075,093 | 12/1991 | Tanaka et al. | 423/432 |
| 5,232,678 | 8/1993 | Bleakley et al. | 423/432 |

FOREIGN PATENT DOCUMENTS 941900 11/1963 United Kingdom ................ 423/432

OTHER PUBLICATIONS

Glasson, D. R., "Reactivity of Lime and Related Oxides. III.* Sorption of Liquid Water on Calcium Oxide ('Wet' Hydration)", *J. appl. Chem.*, 10 Jan., 1960, pp. 38–48.

Glasson, D. R., "Reactivity of Lime and Related Oxides. VI.* Crystal Changes in Carbonatated Lime at Different Temperatures", *J. appl. Chem.*, 11, Jan., 1961, pp. 28–34.

Glasson, D. R., "Reactivity of Lime and Related Oxides. V.* Crystal Changes in Hydrated Lime at Different Temperatures", *J. appl. Chem.*, 11, Jan., 1961, pp. 24–27.

*Primary Examiner*—Michael Lewis
*Assistant Examiner*—Stephen G. Kalinchak
*Attorney, Agent, or Firm*—Fisher, Christen & Sabol

[57] ABSTRACT

In the process for making calcium carbonate by the double decomposition reaction of sodium carbonate and calcium hydroxide in aqueous reaction medium the improvement of producing calcium carbonate having a scalenohedral particle shape and a rosette aggregate structure comprising adding said sodium carbonate in more than one stream to said calcium hydroxide over a period of 1 to 8 hours and maintaining said reaction medium in the range of 80° to 140° F.

20 Claims, 1 Drawing Sheet

PROCESS FOR PREPARATION OF HIGH OPACITY PRECIPITATED CALCIUM CARBONATE BY REACTING SODIUM CARBONATE WITH CALCIUM HYDROXIDE

BACKGROUND OF THE INVENTION

Calcium carbonate is used extensively in the paper industry as a filler component in paper. It is a low cost, high brightness filler used to increase sheet brightness and opacity, Its use has increased dramatically in recent years due to the conversion from acid to alkaline papermaking at many paper mills. Both natural and synthetic calcium carbonates are used in the paper industry. Natural calcium carbonate, or limestone, is ground to a small particle size prior to its use in paper, while synthetic calcium carbonate is manufactured by a precipitation reaction and is called precipitated calcium carbonate (PCC). PCC is typically superior in opacifying and brightening the sheet, as compared to ground calcium carbonate.

The primary method for manufacturing PCC for the paper industry is the carbonation process. In this process, carbon dioxide is bubbled through a slurry of calcium hydroxide to produce PCC. Numerous plants using this process have been installed at paper mill sites, using boiler or kiln flue gas as a source of carbon dioxide. This process has demonstrated the capability to produce PCC with superior opacifying characteristics. Scalenohedral-shaped precipitated calcium carbonate with a rosette-like aggregate structure has been found to impart high sheet opacity and is the predominant product manufactured at these on-site PCC plants. This aggregate rosette structure reduces particle-particle packing and maximizes the PCC-air interfacial area in the sheet, thereby achieving higher opacity. The aggregate rosette structure is also known to increase the bulk of paper in which it is used. The carbonation process has also shown flexibility in producing various particle shapes and sizes for various applications as both a paper filler and in paper coatings.

The soda lime process is another method for manufacturing PCC. Sodium carbonate solution is added to calcium hydroxide slurry to react and produce PCC and sodium hydroxide. This process has the advantage of producing sodium hydroxide as a co-product, which is used in many paper mills. The Kraft pulping cycle uses this reaction in converting green liquor to white liquor. However, the PCC produced in this way is usually not suited as a paper filler due to its larger particle size. Reaction conditions for this application are chosen to maximize sodium hydroxide production, and these conditions typically produce a coarser PCC. Although the soda lime process has been considered for commercial production of PCC for use as a paper filler, no such plants are currently known to exist. Consistent production of a small particle size PCC with good opacifying ability has not been demonstrated yet in the soda lime process. The scalenohedral-shaped PCC with a rosette-like aggregate structure that is produced by the carbonation process and known to impart high opacity has not heretofore been achieved with the soda lime process.

SUMMARY OF THE INVENTION

An object of the present invention is to produce PCC with the soda lime process that has an opacifying ability similar to the high opacity PCC fillers currently produced using the carbonation process.

Another object of the invention is to produce scalenohedral shaped PCC particles that are aggregated together into rosette-like aggregates.

Another objective of the invention is to demonstrate that the size of the PCC particles produced can be controlled.

Another object is to provide by the soda lime process PCC that increases the bulk of paper.

Generally speaking, in practicing this invention sodium carbonate solution is added to calcium hydroxide slurry in a stirred constant-temperature reactor over a specified duration of time as a batch operation. The calcium hydroxide slurry is prepared by adding high-calcium quicklime to water, which is known as slaking. The slurry produced from the reaction of sodium carbonate and calcium hydroxide is filtered to separate the PCC wetcake from the filtrate, which contains sodium hydroxide and residual sodium carbonate. The PCC wetcake is washed to remove residual sodium hydroxide and sodium carbonate and is then reslurried in water. Carbon dioxide gas is then bubbled through the PCC slurry to convert any residual calcium hydroxide into PCC.

It has been found that the soda lime process according to this invention can produce a scalenohedral-shaped PCC with a rosette-like aggregate structure similar to that produced with the carbonation process. The PCC produced from the soda lime process of this invention has the same high opacifying ability as PCC produced from the carbonation process. The critical parameters for achieving the proper PCC structure (i.e. scalenohedral-shaped with rosette-like aggregate structure) and high opacity with the soda lime process have been found to be: (1) reaction temperature, (2) sodium carbonate addition time, (3) sodium carbonate addition method, and (4) type of agitation. Variation of the size of the PCC particles pursuant to this invention has been demonstrated through proper manipulation of the above four parameters. Precipitated calcium carbonate having scalenohedral particle shape, a rosette aggregate structure produced by this invention have scattering coefficients at least as great as 2700 $cm^2/g$ and preferably as great as 2900 $cm^2/g$.

DETAILED DESCRIPTION OF THE PREFERRED EMBODIMENTS

Figure 1:
FIG. 1 is a photomicrograph at a magnification of 10,000 showing surface views of scalenohedral-shaped PCC having a rosette aggregate structure made according to this invention by the process described in Example 3.
Figure 2:
FIG. 2 is a photomicrograph at a magnification of 10,000 showing surface views of the scalenohedral PCC particles having no rosette structure made by the process of Example A.

The proper PCC structure, i.e., scalenohedral shaped particles having a rosette aggregate structure, and particle size pursuant to this invention are obtained at a reaction temperature ranging from 80° to 140° F., preferably 90° to 110° F. This temperature range contrasts dramatically from that used to convert green liquor to white liquor in the Kraft pulping cycle, where reaction temperatures are normally kept above 180° F. Higher temperatures are used to increase production since the reaction rate and conversion also increases with temperature for the soda lime reaction.

The proper PCC structure and particle size are obtained by this invention when the batch addition time for the sodium carbonate solution ranges from 1 to 8 hours. These sodium carbonate addition times are unique since the soda lime reaction can achieve near complete conversion in less than 30 minutes. Although the increased sodium carbonate addition times reduce the production capability, this unique approach enables the proper PCC structure to be achieved.

The proper PCC structure and particle size are obtained pursuant to this invention when the sodium carbonate solution is simultaneously added to the calcium hydroxide slurry in more than one stream, preferably many separate small streams, instead of one large single stream. Preferably at least nine streams are used. The stream size and flow rate in each stream may need to be reduced and the number of streams increased in order to achieve the proper PCC structure and particle size. For larger reaction vessels, i.e., as the quantity of calcium hydroxide reactant is increased, a greater number of sodium carbonate streams can be used to produce the proper PCC structure and particle size. Although distributed addition of a reactant solution is not unusual in general practice, it is believed that this approach is unique for the soda lime reaction in conjunction with the above-mentioned temperature and addition time constraints.

An axial-flow type impeller is preferred to provide uniform mixing by causing the reaction mass to flow down the impeller shaft and up the sides of the reaction vessel.

Stoichiometric ratios can be used for the soda lime reaction. A slight excess of sodium carbonate (up to 10%, molar basis) is desirable to maximize the conversion of the reaction and thereby minimize the amount of residual calcium hydroxide in the products.

Maximizing the concentrations of sodium carbonate and calcium hydroxide is desirable since this results in an increase in the strength of the caustic filtrate coproduct making it more readily usable in subsequent processing in the paper mill. In general, sodium carbonate concentrations used are slightly less than the solubility limit at the reaction temperatures. Calcium hydroxide concentrations below 15 weight % are desirable to prevent the slurry mixture from gelling during the reaction. Gelling of the reaction slurry is not desirable since it impedes the mixing of the slurry during the reaction.

Calcium hydroxide slurry reactant is prepared by slaking lime in water. The lime must have a high calcium oxide content (>90 weight %) and preferably has a high reactivity in water. Reactivity is determined in the laboratory by measuring the temperature rise that occurs in 30 seconds after a lime sample is added to water at a lime to water ratio of 4 to 1. A temperature rise of at least 30° C. is preferred.

The following examples are presented. In each example an axial-flow type impeller was used.

EXAMPLE 1

This Example shows that the soda lime reaction can produce a scalenohedral-shaped PCC with a rosette-like aggregate structure and a high opacifying ability similar to that produced using the carbonation process. In this example, aqueous sodium carbonate solution (1400 cc, 316 g/l) was gradually added at a constant rate in 9 streams to an agitated 6 liter reactor containing aqueous calcium hydroxide slurry (2100 cc, 134 g/l). The total addition time for the sodium carbonate solution was 2.2 hours. The sodium carbonate solution and the contents of the reactor were maintained at a constant temperature of 100° F. throughout the reaction. The reaction mixture was agitated at this temperature for 20 minutes after completion of sodium carbonate addition and the resulting slurry was filtered to form a PCC wet cake which was then washed with water to remove residual NaOH. The washed wet cake was then reslurried in water to form a slurry through which $CO_2$ was bubbled to convert any residual calcium hydroxide into PCC. The resulting PCC slurry was ready for use in making or coating paper.

The resulting PCC was then tested to determine its opacifying ability, particle size, and particle structure. The scattering coefficient of the PCC is a measure of its opacifying ability and was determined from handsheets prepared with PCC. The average particle size was determined using a Model 5100 Micromeritics Sedigraph particle size analyzer, which estimates the particle size based on the settling rate of the particles. The particle structure was determined from photographs taken with a scanning electron microscope at a magnification of 10,000 times the actual size. For comparison. PCC that had been prepared by the carbonation process using the same batch of calcium hydroxide slurry was tested. The properties of the soda lime PCC, made pursuant to this invention, and the carbonation PCC are shown in Table 1 below.

TABLE 1

| Property | Soda Lime PPC | Carbonation PCC |
| --- | --- | --- |
| Scattering Coefficient, $cm^2/g$ | 2800 | 2900 |
| Average Particle Size, microns | 1.2 | 1.3 |
| Particle Shape | scalenohedral | scalenohedral |
| Aggregate Structure | rosette | rosette |

These results show that the properties of the soda lime PCC made pursuant to Example 1 and the carbonation PCC are very similar.

EXAMPLE 2

This Example refers to work on a pilot scale and shows that the soda lime reaction carried out pursuant to this invention can produce a scalenohedral-shaped PCC with a rosette-like aggregate structure and a high opacifying ability similar to that produced using the carbonation process. In this example, sodium carbonate solution (132 liters, 316 g/l) was gradually added in 33 streams at a constant rate to an agitated 100 gallon reactor containing calcium hydroxide slurry (196 liters, 135 g/l). The total addition time for the sodium carbonate solution was 3.2 hours. The sodium carbonate solution and the contents of the reactor were maintained at a constant temperature of 100° F. throughout the reaction. The reaction mixture was agitated at this temperature for 15 minutes after completion of sodium carbonate addition and the resulting slurry was filtered to form a PCC wet cake which was then washed with water to remove residual NaOH. The washed wet cake was then reslurried in water to form a slurry through which $CO_2$ was bubbled to convert any residual calcium hydroxide into PCC. The resulting PCC slurry was ready for use in making or coating paper. The resulting PCC produced was tested in the same manner as described in Example 1. As was done in Example 1, a corresponding PCC produced by the carbonation process was also tested. The test results are shown in Table 2 below.

TABLE 2

| Property | Soda Lime PPC | Carbonation PCC |
|---|---|---|
| Scattering Coefficient, cm$^2$/g | 2900 | 2900 |
| Average Particle Size, microns | 1.5 | 1.4 |
| Particle Shape | scalenohedral | scalenohedral |
| Aggregate Structure | rosette | rosette |

These results show that the properties of the soda lime PCC made pursuant to this Example were substantially the same as PCC made by the carbonation process.

EXAMPLE 3

This Example illustrates work on a commercial scale and shows that the soda lime reaction can produce a scalenohedral-shaped PCC with a rosette-like aggregate structure and a high opacifying ability similar to that produced using the carbonation process. In this Example, aqueous sodium carbonate solution (3700 gals, 2.61 #/gal.) was gradually added in 160 streams at a constant rate to an agitated 10,000 gallon reactor containing calcium hydroxide slurry (5500 gals., 1.11 #/gal). The total addition time for the sodium carbonate solution was 4.4 hours. The sodium carbonate solution and the contents of the reactor were maintained at a constant temperature of 95° F. throughout the reaction. The reaction mixture was agitated at this temperature for 40 minutes after completion of sodium carbonate addition and samples of the resulting slurry were filtered to form a PCC wet cake which was then washed with water to remove residual NaOH. The washed wet cake was then reslurried in water to form a slurry through which CO$_2$ was bubbled to convert any residual calcium hydroxide into PCC. The resulting PCC slurry was ready for use in making or coating paper. The resulting PCC produced was tested in the same manner as described in Example 1. As was done in Example 1, the corresponding PCC produced by the carbonation process was also tested. The test results are shown in Table 3.

TABLE 3

| Property | Soda Lime PPC | Carbonation PCC |
|---|---|---|
| Scattering Coefficient, cm$^2$/g | 2700 | 3000 |
| Average Particle Size, microns | 1.8 | 1.3 |
| Particle Shape | scalenohedral | scalenohedral |
| Aggregate Structure | rosette | rosette |

These results show that these properties of the soda lime PCC made pursuant to Example 3 were substantially equivalent to PCC made by the carbonation process.

EXAMPLE A, B and C

For comparison, Examples A, B and C are given in which the critical process parameters of reaction temperature and sodium carbonate addition time were not within the optimum ranges. Examples A, B and C do not illustrate the invention. In Examples A and C, aqueous sodium carbonate solution (1410 cc, 312 g/l) was added in 9 streams at a constant rate to an agitated 6 liter reactor containing calcium hydroxide slurry (2110 cc, 133 g/l). In Example B, aqueous sodium carbonate solution (1400 cc, 317 g/l) was added in 9 streams at a constant rate to an agitated 6 liter reactor containing calcium hydroxide slurry (2100 cc, 135 g/l). The total addition time for the sodium carbonate solution for each Example is given in Table 4 below. The sodium carbonate solution and the contents of the reactor were maintained at the constant temperature given in Table 4 for each Example throughout the reaction. The resulting PCC produced was tested in the same manner as described in Example 1. As was done in Example 1, the corresponding PCC produced by the carbonation process was also tested and showed a scattering coefficient cm$^2$/g of 2900, an average particle size of 1.3 microns, a scalenohedral particle shape and a rosette aggregate structure.

The process conditions for each Example and the properties of the PCC produced by each Example are summarized in Table 4.

TABLE 4

SUMMARY OF EXAMPLES

| EXAMPLE NUMBER: | 1 | 2 | 3 | A | B | C |
|---|---|---|---|---|---|---|
| REACTION CONDITIONS | | | | | | |
| Reaction Temperature, F. | 100 | 100 | 95 | 150 | 90 | 150 |
| Sodium Carbonate Addition Time, hours | 2.2 | 3.2 | 4.4 | 0.25 | 0.25 | 1.25 |
| Reactor Size, gallons | 1.6 | 100 | 10000 | 1.6 | 1.6 | 1.6 |
| Agitation Speed, rpm | 2250 | 420 | 125 | 2250 | 2250 | 2250 |
| Impeller Diameter, inches | 2.5 | 11.8 | 58 | 2.5 | 2.5 | 2.5 |
| PCC PROPERTIES | | | | | | |
| Scattering Coefficient, square cm/g | 2800 | 2900 | 2700 | 2200 | 1900 | 1800 |
| Average Particle Size, microns (1) | 1.2 | 1.5 | 1.8 | 1.7 | 1.7 | 2.2 |
| Average Individual Particle Length, microns (2) | 1.2 | 1.1 | 1.7 | 2.6 | 0.3 | 3.8 |
| Particle Shape | scalenohedral | scalenohedral | scalenohedral | scalenohedral | small scalenohedral | scalenohedral |
| Aggregate Structure | rosette | rosette | rosette | individual particles (3) | random clusters (3) | individual particles (3) |

NOTES:
(1) Measured by Micromeritics model 5100 SediGraph.
(2) Estimated from scanning electron microscope photographs.
(3) No rosette-like aggregate structure.

The opacifying abilities of the soda lime PCC produced in Examples A, B and C were significantly lower than the PCC produced in Examples 1–3, as indicated by a 25% or more reduction in the scattering coefficient. In addition, the resulting PCC's of Examples A, B and C were predominantly individual scalenohedral particles with only a few aggregates or were random clusters.

It is evident from Examples 1-3 that the soda lime reaction as practiced pursuant to this invention can produce a scalenohedral-shaped PCC with a rosette-like aggregate structure and a high opacifying ability similar to that produced using the carbonation process.

It will be understood that while the invention has been described in terms of and with the aid of many illustrative examples, numerous changes in details, proportions, ingredients, and the like may be made within the broad scope of the invention, as defined by the claims which follow.

What is claimed is:

1. In the process for making calcium carbonate by double decomposition reaction of sodium carbonate and calcium hydroxide in aqueous reaction medium, the improvement of producing calcium carbonate having a scalenohedral particle shape and a rosette aggregate structure comprising adding said sodium carbonate in more than one separate stream to said calcium hydroxide over a period of 1 to 8 hours and maintaining the temperature of said reaction medium in the range of 80° to 140° F.

2. Improvement as claimed in claim 1 wherein said sodium carbonate is added as an aqueous solution in at least nine streams to the calcium hydroxide.

3. Improvement as claimed in claim 1 wherein said reaction medium is agitated with an axial-flow type impeller.

4. Improvement as claimed in claim 1 wherein the amount of said sodium carbonate used ranges from the stoichiometric amount up to a 10 percent excess on a molar basis.

5. Improvement as claimed in claim 1 wherein said sodium carbonate is added as an aqueous solution having a concentration up to the solubility limit of sodium carbonate in water at the temperature of the reaction medium.

6. Improvement as claimed in claim 1 wherein the concentration of said calcium hydroxide in said medium is below about 15 weight percent.

7. Improvement as claimed in claim 1 wherein said calcium hydroxide is prepared by slaking lime having a calcium oxide content of at least 90 weight percent.

8. Improvement as claimed in claim 1 wherein the reaction medium after completion of sodium carbonate addition is filtered to form a filter cake comprising calcium carbonate and a filtrate comprising sodium hydroxide and residual sodium carbonate.

9. Improvement as claimed in claim 8 wherein said filter cake is washed with water to remove residual sodium hydroxide and sodium carbonate and the washed filter cake is reslurried in water and exposed to $CO_2$ gas to convert residual calcium hydroxide to calcium carbonate.

10. Improvement as claimed in claim 1 wherein the sodium carbonate is added in at least two separate and simultaneous streams.

11. Process of producing calcium carbonate by double decomposition reaction of sodium carbonate and calcium hydroxide in aqueous reaction medium, wherein the calcium carbonate has a scalenohedral particle shape and a rosette aggregate structure comprising the steps of:
(a) adding aqueous sodium carbonate solution in more than one separate stream to an aqueous calcium hydroxide slurry over a period of 1 to 8 hours;
(b) maintaining the temperature of said reaction medium at about 80° to about 140° F. during step (a); and
(c) filtering said reaction medium to recover calcium carbonate in the resulting filter cake and sodium hydroxide in the resulting filtrate.

12. Process as claimed in claim 11 wherein said sodium carbonate is added in at least nine streams.

13. Process as claimed in claim 11 wherein said reaction medium is agitated with an axial-flow type impeller.

14. Process as claimed in claim 11 wherein the amount of said sodium carbonate used ranges from the stoichiometric amount up to a 10 percent excess on a molar basis.

15. Process as claimed in claim 11 wherein said sodium carbonate is added as an aqueous solution having a concentration up to the solubility limit of sodium carbonate in water at the temperature of the reaction medium.

16. Process as claimed in claim 11 wherein the concentration of said calcium hydroxide in said medium is below about 16 weight percent.

17. Process as claimed in claim 11 wherein said calcium hydroxide is prepared by slaking lime having a calcium oxide content of at least 90 weight percent.

18. Process as claimed in claim 11 wherein the reaction medium after completion of sodium carbonate addition is filtered to form a filter cake comprising calcium carbonate and a filtrate comprising sodium hydroxide and residual sodium carbonate.

19. Process as claimed in claim 18 wherein said filter cake is washed with water to remove residual sodium hydroxide and sodium carbonate and the washed filter cake is reslurried in water and exposed to $CO_2$ gas to convert residual calcium hydroxide to calcium carbonate.

20. Process as claimed in claim 11 wherein the sodium carbonate is added in at least two separate and simultaneous streams.

* * * * *